(12) United States Patent
Wagner et al.

(10) Patent No.: US 10,618,177 B2
(45) Date of Patent: Apr. 14, 2020

(54) SYSTEMS AND METHODS FOR PROVIDING CONTACT DETECTION IN AN ARTICULATED ARM

(71) Applicant: Berkshire Grey, Inc., Lexington, MA (US)

(72) Inventors: Thomas Wagner, Concord, MA (US); Kevin Ahearn, Fort Mill, SC (US); Michael Dawson-Haggerty, Pittsburgh, PA (US); Christopher Geyer, Arlington, MA (US); Thomas Koletschka, Cambridge, MA (US); Kyle Maroney, North Attleboro, MA (US); Matthew T. Mason, Pittsburgh, PA (US); Gene Temple Price, Cambridge, MA (US); Joseph Romano, Somerville, MA (US); Daniel Smith, Canonsburg, PA (US); Siddhartha Srinivasa, Seattle, WA (US); Prasanna Velagapudi, Pittsburgh, PA (US); Thomas Allen, Reading, MA (US)

(73) Assignee: Berkshire Grey, Inc., Lexington, MA (US)

( * ) Notice: Subject to any disclaimer, the term of this patent is extended or adjusted under 35 U.S.C. 154(b) by 0 days.

(21) Appl. No.: 16/212,113

(22) Filed: Dec. 6, 2018

(65) Prior Publication Data

US 2019/0105782 A1    Apr. 11, 2019

Related U.S. Application Data

(63) Continuation of application No. 15/242,255, filed on Aug. 19, 2016.

(Continued)

(51) Int. Cl.
*G01P 1/00* (2006.01)
*B25J 9/16* (2006.01)
(Continued)

(52) U.S. Cl.
CPC .......... *B25J 9/1694* (2013.01); *B25J 9/1638* (2013.01); *B25J 13/088* (2013.01); *B25J 15/0616* (2013.01); *B25J 17/0208* (2013.01)

(58) Field of Classification Search
CPC .................................................. G01L 1/2201
See application file for complete search history.

(56) References Cited

U.S. PATENT DOCUMENTS 2,853,333 A    9/1958 Littell
3,005,652 A    10/1961 Helm et al.
(Continued)

FOREIGN PATENT DOCUMENTS

DE    3810989 A1    8/1989
DE    10121344 A1 * 11/2002
(Continued)

OTHER PUBLICATIONS

International Preliminary Report on Patentability issued by International Bureau in related International Patent Application No. PCT/US2016/047869 dated Mar. 8, 2019, 18 pgs.
(Continued)

*Primary Examiner* — Jamel E Williams
(74) *Attorney, Agent, or Firm* — Gesmer Updegrove LLP

(57) ABSTRACT

A sensing manipulator of an articulated arm is disclosed. The sensing manipulator includes a compliant section and a movement detection system provided along a first direction of the compliant section such that movement of the compliant section along both the first direction and at least one direction transverse to said first direction, are detectable by the movement detection system.

55 Claims, 8 Drawing Sheets

Related U.S. Application Data

(60) Provisional application No. 62/210,235, filed on Aug. 26, 2015.

(51) Int. Cl.
*B25J 15/06* (2006.01)
*B25J 13/08* (2006.01)
*B25J 17/02* (2006.01)

(56) References Cited

U.S. PATENT DOCUMENTS

| | | |
|---|---|---|
| 3,195,941 A | 7/1965 | Morey |
| 3,637,249 A | 1/1972 | Kuhl et al. |
| 4,389,064 A | 6/1983 | Laverriere |
| 4,412,775 A | 11/1983 | Molitor et al. |
| 4,557,659 A | 12/1985 | Scaglia |
| 4,561,686 A | 12/1985 | Atchley |
| 5,024,575 A | 6/1991 | Anderson |
| 5,752,729 A | 5/1998 | Crozier et al. |
| 5,764,013 A * | 6/1998 | Yae .................. B25J 9/042 318/568.11 |
| 5,777,267 A * | 7/1998 | Szydel ............... B25J 19/0025 174/72 A |
| 5,865,487 A | 2/1999 | Gore et al. |
| 6,244,640 B1 | 6/2001 | Le Bricquer et al. |
| 6,817,639 B2 | 11/2004 | Schmalz et al. |
| 7,140,389 B2 | 11/2006 | Schnatterer et al. |
| 7,263,890 B2 | 9/2007 | Takahashi |
| 7,474,939 B2 | 1/2009 | Oda et al. |
| 7,618,074 B2 | 11/2009 | Zimmer |
| 7,677,622 B2 | 3/2010 | Dunkmann et al. |
| 8,070,203 B2 | 12/2011 | Schaumberger |
| 8,132,835 B2 | 3/2012 | Ban et al. |
| 8,267,386 B2 | 9/2012 | Schaaf et al. |
| 8,777,284 B2 | 7/2014 | Schaller et al. |
| 9,061,868 B1 | 6/2015 | Paulsen et al. |
| 9,227,323 B1 | 1/2016 | Konolige et al. |
| 9,259,844 B2 | 2/2016 | Xu et al. |
| 9,266,237 B2 | 2/2016 | Nomura |
| 9,283,680 B2 | 3/2016 | Yasuda et al. |
| 9,486,926 B2 | 11/2016 | Kawano |
| 9,492,923 B2 | 11/2016 | Wellman et al. |
| 9,604,363 B2 | 3/2017 | Ban |
| 9,623,570 B1 | 4/2017 | Krahn et al. |
| 9,656,813 B2 | 5/2017 | Dunkmann et al. |
| 2001/0045755 A1 | 11/2001 | Schick et al. |
| 2003/0038491 A1 | 2/2003 | Schmalz et al. |
| 2003/0164620 A1 | 9/2003 | Schmalz et al. |
| 2009/0019818 A1 | 1/2009 | Gilmore et al. |
| 2010/0109360 A1 * | 5/2010 | Meisho ............... B23P 19/105 294/86.4 |
| 2010/0175487 A1 * | 7/2010 | Sato .................. G01L 1/14 73/862.69 |
| 2010/0180711 A1 | 7/2010 | Kilibarda et al. |
| 2011/0126681 A1 * | 6/2011 | Blanchet .............. B26D 1/24 83/51 |
| 2013/0129464 A1 | 5/2013 | Regan et al. |
| 2013/0232918 A1 | 9/2013 | Lomerson, Jr. |
| 2013/0277999 A1 | 10/2013 | Schaller et al. |
| 2014/0005831 A1 * | 1/2014 | Naderer ............... B25J 9/1633 700/258 |
| 2015/0081090 A1 | 3/2015 | Dong |
| 2015/0298316 A1 | 10/2015 | Accou et al. |
| 2015/0328779 A1 | 11/2015 | Bowman et al. |
| 2015/0375401 A1 | 12/2015 | Dunkmann et al. |
| 2016/0136816 A1 | 5/2016 | Pistorino |
| 2016/0271805 A1 | 9/2016 | Kuolt et al. |
| 2017/0050315 A1 | 2/2017 | Henry et al. |
| 2017/0106532 A1 | 4/2017 | Wellman et al. |

FOREIGN PATENT DOCUMENTS

| | | |
|---|---|---|
| DE | 10121344 A1 | 11/2002 |
| EP | 0613841 A1 | 9/1994 |
| EP | 1671906 A1 | 6/2006 |
| EP | 1256421 B1 | 1/2008 |
| EP | 2014587 A2 | 1/2009 |
| EP | 2181814 A1 | 5/2010 |
| EP | 2960024 A2 | 12/2015 |
| FR | 2527968 A | 12/1983 |
| FR | 2592827 A1 * | 7/1987 |
| FR | 2592827 A1 | 7/1987 |
| JP | 2010201536 A | 9/2010 |
| WO | 2010034044 A2 | 4/2010 |
| WO | 2014161549 A1 | 10/2014 |
| WO | 2015162390 A1 | 10/2015 |

OTHER PUBLICATIONS

International Preliminary Report on Patentability issued by International Bureau in related International Patent Application No. PCT/US2016/048968 dated Mar. 8, 2018, 10 pgs.

International Search Report & Written Opinion issued by the International Searching Authority in related International Patent Application No. PCT/US2016/047869 dated Nov. 9, 2016, 12 pgs.

Office Action issue by Canadian Intellectual Property Office in related Canadian Patent Application No, 2,996,698 dated Feb. 22, 2019, 3 pgs.

Rule 161 (1) Communication issued in related European Patent Application No. 16758342.6-1018 dated Apr. 5, 2018, 3 pgs.

Office Action issued by the Canadian Intellectual Property Office dated Dec. 16, 2019 in related Canadian Patent Application No. 2,996,698, 3 pages.

* cited by examiner

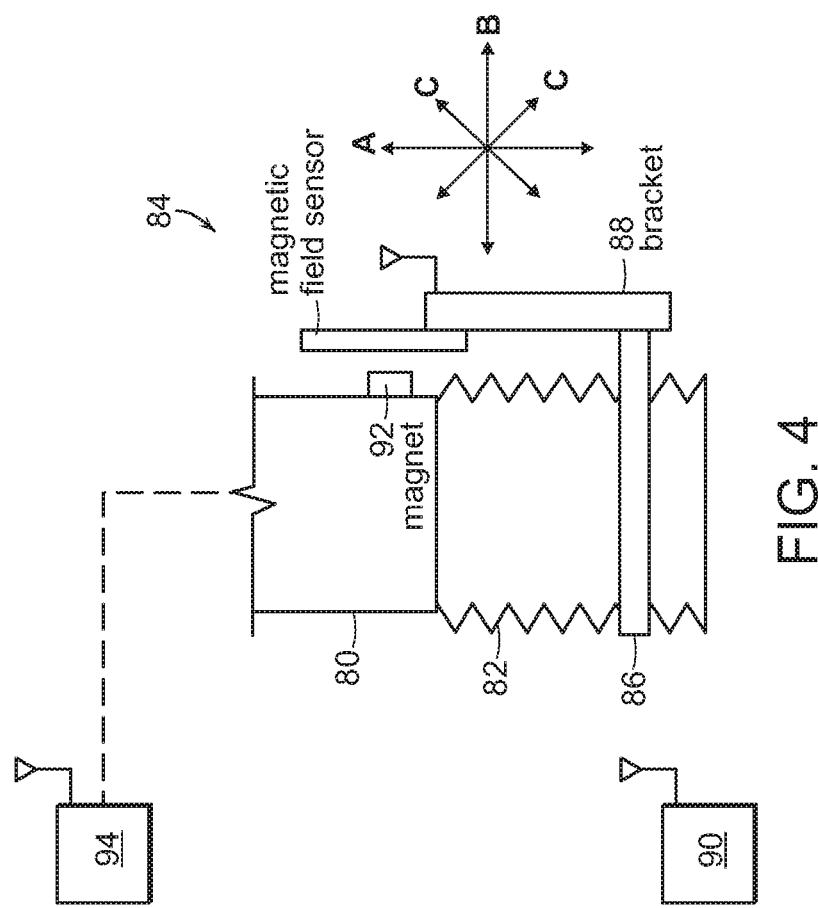
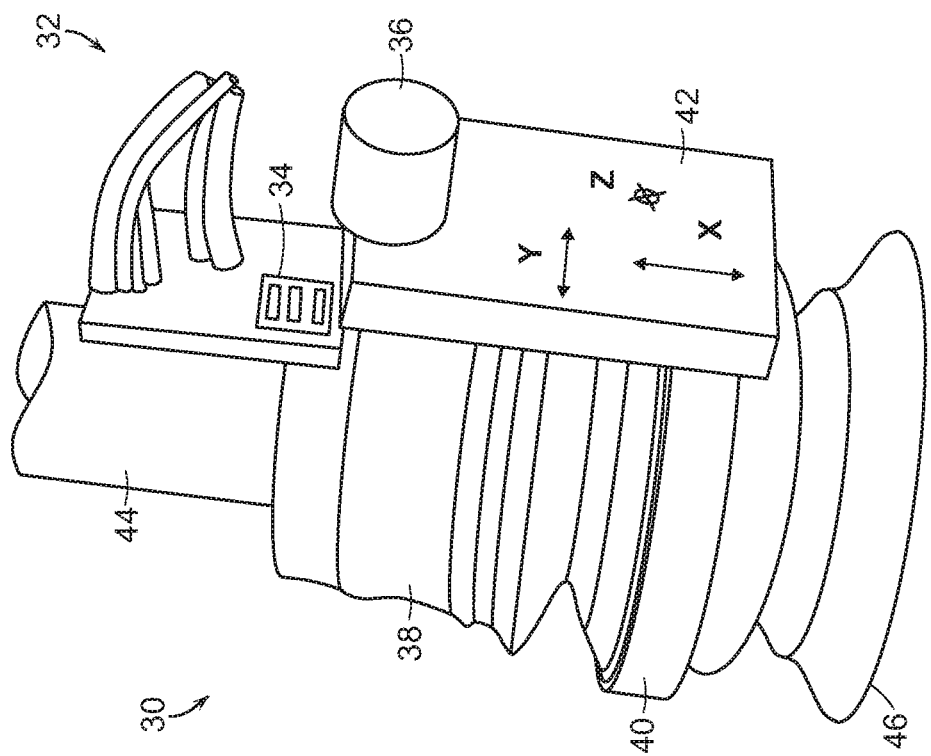
FIG. 4
FIG. 3

SYSTEMS AND METHODS FOR PROVIDING CONTACT DETECTION IN AN ARTICULATED ARM

PRIORITY

The present application claims priority to U.S. patent application Ser. No. 15/242,255, filed Aug. 19, 2016, and U.S. Provisional Patent Application Ser. No. 62/210,235, filed Aug. 26, 2015, the disclosures of which are hereby incorporated by reference in their entireties.

BACKGROUND

The invention generally relates to robotic and other sortation systems, and relates in particular to articulated arm systems for use in sortation systems.

Systems and methods using mechanical compliance to improve robot performance during grasping and manipulation are known. Purpose-built compliant elements exist commercially that function as safety guards, such as, for example, position sensors sold by ABB Automation Technology Products AB of Sweden. These devices may include magnetic breakaway or spring elements that deflect when contact between the robot and the environment is made. Additionally, these designs can include rudimentary on/off sensing of a breakaway state, which is often used as a stop signal to the robot controller.

More modern robotic systems in industry and academia have incorporated flexible elements and deformation sensors in the joints of a robot arm (see for example, the Baxter Robot sold by Rethink Robotics, Inc. of Boston, Mass. and the DLR Lightweight Robot III developed by the Institute of Robotics and Mechanics at German Aerospace Center in Germany). Through the combined sensing of deformation at each joint, an approximation of the force at the end-effector may be deduced. Such an implementation is undesirable in certain applications however (for example, due to unnecessary added compliance that may degrade the positional accuracy of the end-effector, added mechanical complexity and cost, and decreased payload capabilities of the robotic system), with the added complication that any highly flexible end-effector on the robot arm causes the loads transmitted through to the joints to be fairly small and difficult to reliably measure.

Force sensors are also known to be used in robotic manipulation systems. A typical force sensor consists of a rigid plate instrumented with several micro-scale deformation sensors such as strain gauges. This plate is commonly placed between the robot end-effector and the robot arm, and used to sense forces and torques acting on the end-effector. These sensors tend to be expensive and difficult to calibrate accurately since they measure deflections or strain on very small scales. Furthermore, a force sensor mounted between the end-effector and robot arm suffers from the issue mentioned above for joint-sensors, namely that highly flexible elements on the end-effector will not create significant forces for detection at the force sensor.

There remains a need therefore for an improved sensing system for robotic and other sortation systems.

SUMMARY

In accordance with an embodiment, the invention provides a sensing manipulator of an articulated arm. The sensing manipulator includes a compliant section and a movement detection system provided along a first direction of the compliant section such that movement of the compliant section along both the first direction and at least one direction transverse to the first direction, are detectable by the movement detection system.

In accordance with another embodiment, the sensing manipulator includes a compliant section providing movement of the compliant section in at least two degrees of freedom, and a movement detection system providing output data regarding movement of the compliant section in the at least two degrees of freedom.

In accordance with a further embodiment, the invention provides a method of sensing the position an orientation of an object held by a manipulator at an end effector of a robotic system. The method includes the steps of engaging the object in a working environment of the robotic system, perceiving an initial position of a movement detection system, lifting the object against gravity, and perceiving at least two of load, pitch, roll and yaw of the object with respect to the initial position of the movement detection system.

BRIEF DESCRIPTION OF THE DRAWINGS

The following description may be further understood with reference to the accompanying drawings in which:

FIG. 3 shows an illustrative diagrammatic isometric view of a sensing manipulator in accordance with an embodiment of the present invention;

FIG. 4 shows an illustrative diagrammatic view of a sensing manipulator in accordance with another embodiment of the present invention

The drawings are shown for illustrative purposes only.

DETAILED DESCRIPTION

The invention provides in accordance with an embodiment, a novel sensing manipulator that tracks the physical deformation of a robot end-effector as it makes contact with an environment, including an object within the environment. Many robot end-effector designs rely on flexible passively-compliant elements that deform to accommodate the environment. This compliance is used to improve the quality and reliability of contact during grasping and manipulation, and to reduce the impact loads applied to both the robot and objects during contact.

The novel sensing manipulator discussed herein in accordance with certain embodiments tracks these various modes of deformation, and provides this information for use in higher-level automation software to determine significant details about the state of end-effector contact with the environment. This mode of sensing eliminates the need for an additional complex mechanical element traditionally used to sense forces or add compliance to a robot system, while minimally altering the stiffness and inertia of the pre-existing hardware. Placing the sensor as close as possible to the contact site, in accordance with an embodiment, ensures it is able to obtain signals relevant to the manipulation task unaltered by the dynamics of transmission through the robot structure.

In accordance with certain embodiments, sensing manipulators of the present invention may have several primary features with many ancillary benefits, summarized here and discussed in more detail below.

The position deformation sensor design methodology provides A) a sensing strategy that can sense the deformation of a compliant element along multiple axes simultaneously, B) a sensing system that can be applied to a variety of pre-existing compliant elements and eliminates the need for new mechanical complexity along the serial chain of a robot arm, C) a sensor solution that minimally affects the stiffness or inertia of existing compliant elements, and D) a sensor that is placed near the end-effector contact surface to obtain data that is both highly sensitive and is unaltered by the dynamics of force transmission through the robot.

The novel software and algorithms of certain embodiments of the invention further provide A) software strategies that use the sensor information to detect the presence or absence of contact with the world, and B) software strategies that detect the amount of force and torque imparted on the end-effector due to the external load of the object and grasping configuration.

Figure 1:
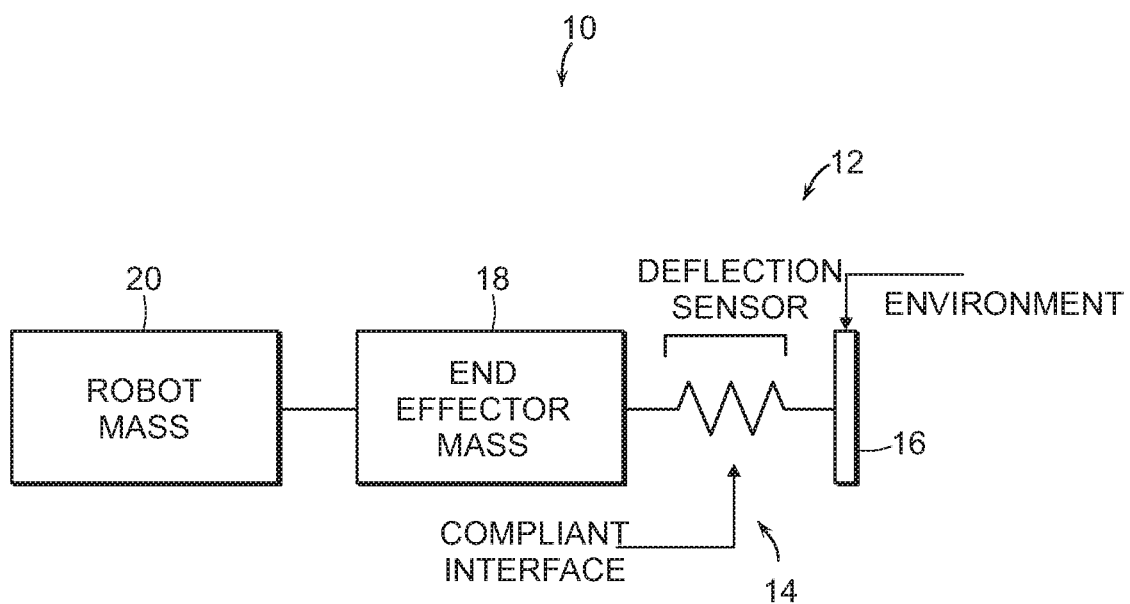
FIG. 1 shows an illustrative diagrammatic function block view of a robotic system including a sensing manipulator system in accordance with an embodiment of the present invention.

This general approach of deflection sensing and algorithms applied to process the resultant data, is illustrated via several examples as follows. The design and methodology may be understood initially by considering a simplified illustration of the deflection sensor design as shown in FIG. 1. FIG. 1 shows a deformation sensor application diagram in accordance with an embodiment of the present invention, where the deformation sensor is positioned adjacent the environment such that the sensing of the deflection sensor of FIG. 1 occurs at the point of contact with the environment.

Figure 2A:
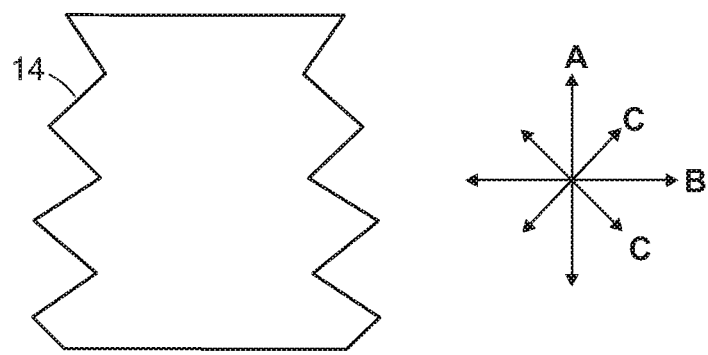
FIGS. 2A and 2B show illustrative diagrammatic views of compliant interfaces for use in various embodiments of the present invention.
Figure 2B:
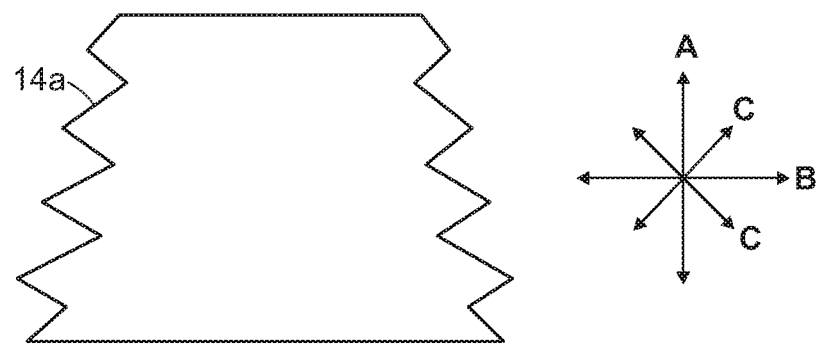

In particular, the robotic system 10 includes a movement detection system 12 such as a deflection sensor that is provided with a compliant interface 14 such as a vacuum cup, for engaging an environment 16. The movement detection system 12 and the compliant interface 14 are coupled to an end effector 18 attached to a robotic mass 20 of the robotic system. The compliant interface may be formed in a shape of a tubular or conical bellows using a flexible material as shown at 14 and 14a in FIGS. 2A and 2B respectively. Note that the compliant interface may move in not only a direction as shown at A, but may also move in second directions shown at B (as shown) and D (into and out of the page) that are transverse to the first direction, as well as directions as shown at C that are partially transverse to the first direction. Also note the compliant interface is not necessarily a part of the deflection sensor itself, but may, in certain embodiments, be a natural part of the manipulation system.

The deformation sensor may be applied to systems where the deformation is not tightly constrained but rather provides multi-axis sensing, meaning that deformation may occur linearly, rotationally, or along complex paths. The ability to allow for and sense this complex deformation is a key differentiator from prior art systems. Several technologies can be applied to provide sensors to the compliant interface. It is important that this sensing not restrict or impede the compliant motion, or add significant inertia or mass. Several sensors could be applied to measure the deformation including but not limited to; flex sensors (such as flex-sensitive resistors or capacitive sensors), magnetic field sensors (such as a compass or hall-effect sensors), or potentiometers.

FIG. 3 shows a sensing manipulator 30 in accordance with another embodiment of the invention wherein the sensing manipulator includes a movement detection system 32. The movement detection system 32 includes a static 3-axis magnetic field sensor 34 that is aligned against a magnet 36 attached to the central part of the compliant cup 38 by a ring 50. A vacuum is provided at an open end 46 of the complaint cup 38. As the compliant cup 38 moves, so too does the ring 40. As the ring 40 around the cup moves, so too does a bracket 42 as well as a magnet 46, which movement is detected with respect to the magnet sensor 44 attached to the articulated arm 54 for sensing the axial flexure of the vacuum cup from which translations/roll/pitch/of the cup. When the magnetic field sensor is employed, the system may determine not only movements in the elongated direction (x) of the deflection sensor with respect to the articulated arm, but also movements in directions (y and z) that are transverse to the elongated direction of the deflection sensor as well as directions that are partially transverse to the elongated direction of the deflection sensor.

With reference to FIG. 4, in accordance with a further embodiment, the system may include an articulated arm 80 to which is attached an end effector 82, again, which may be a tubular or conical shaped bellows. The end effector 82 also includes a sensor 84 that includes an attachment band 86 on the bellows, as well as a bracket 88 attached to magnetic field sensor 90, and a magnet 92 is mounted on the articulated arm 80. As the bellows moves in any of three directions (e.g., toward and away from the articulated arm as shown diagrammatically at A, in directions transverse to the direction A as shown at B, and directions partially transverse to the direction A as shown at C. The magnetic field sensor 90 may communicate (e.g., wirelessly) with a controller 90, which may also communicate with a flow monitor 94 to determine whether a high flow grasp of an object is sufficient for continued grasp and transport as discussed further below. In certain embodiment, for example, the system may return the object if the air flow is insufficient to carry the load, or may increase the air flow to safely maintain the load.

Figure 5A:
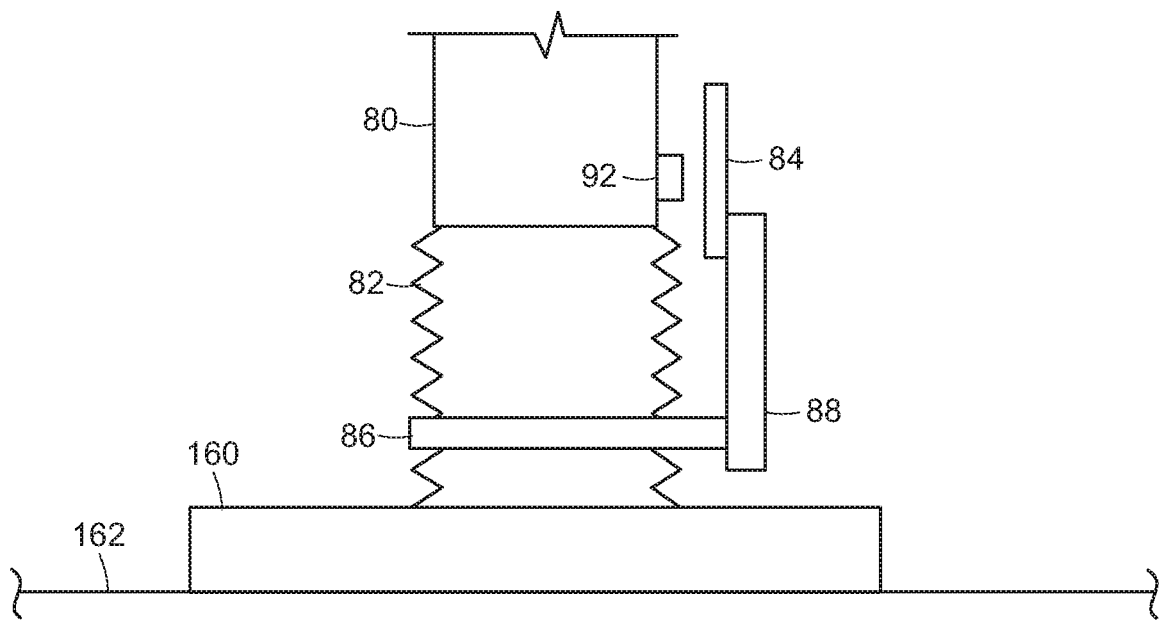
FIGS. 5A and 5B show illustrative diagrammatic views of an end effector in a system of an embodiment of the present invention engaging a relatively light object.
Figure 5B:
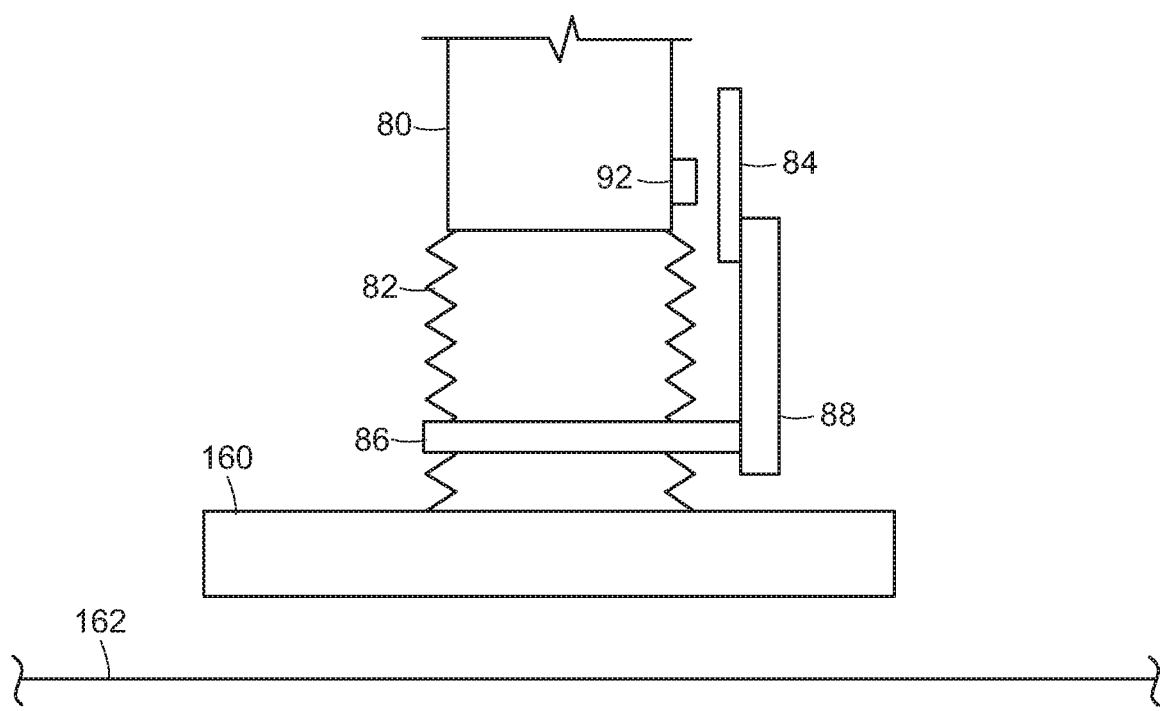
Figure 6A:
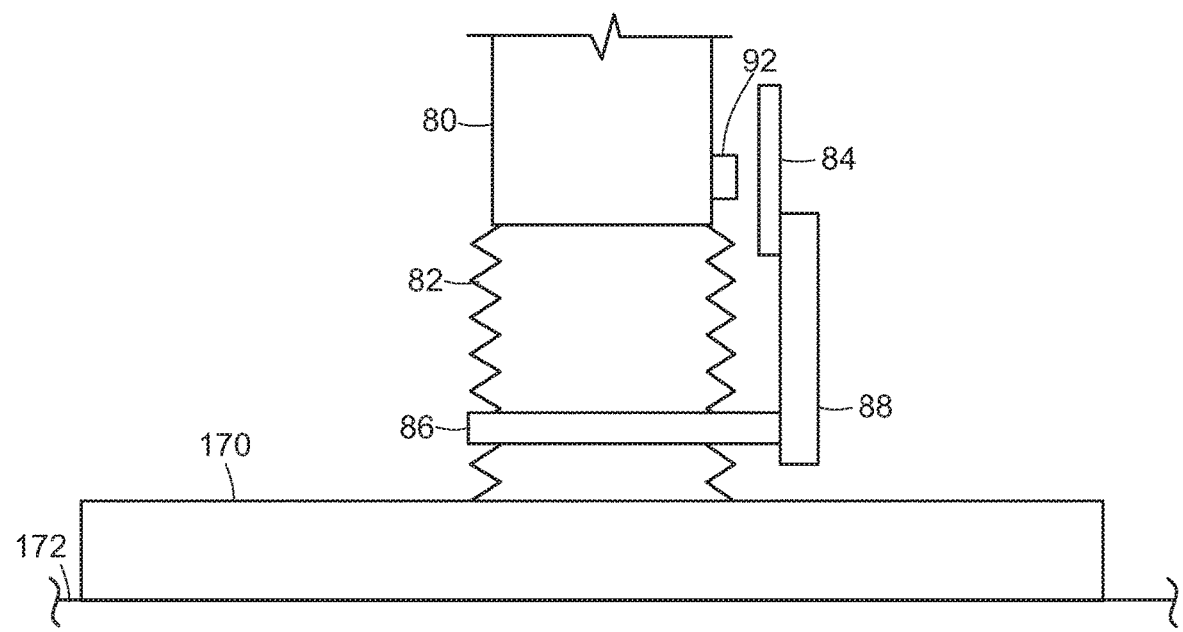
FIGS. 6A and 6B show illustrative diagrammatic views of an end effector in a system of an embodiment of the present invention engaging a relatively heavy object.
Figure 6B:
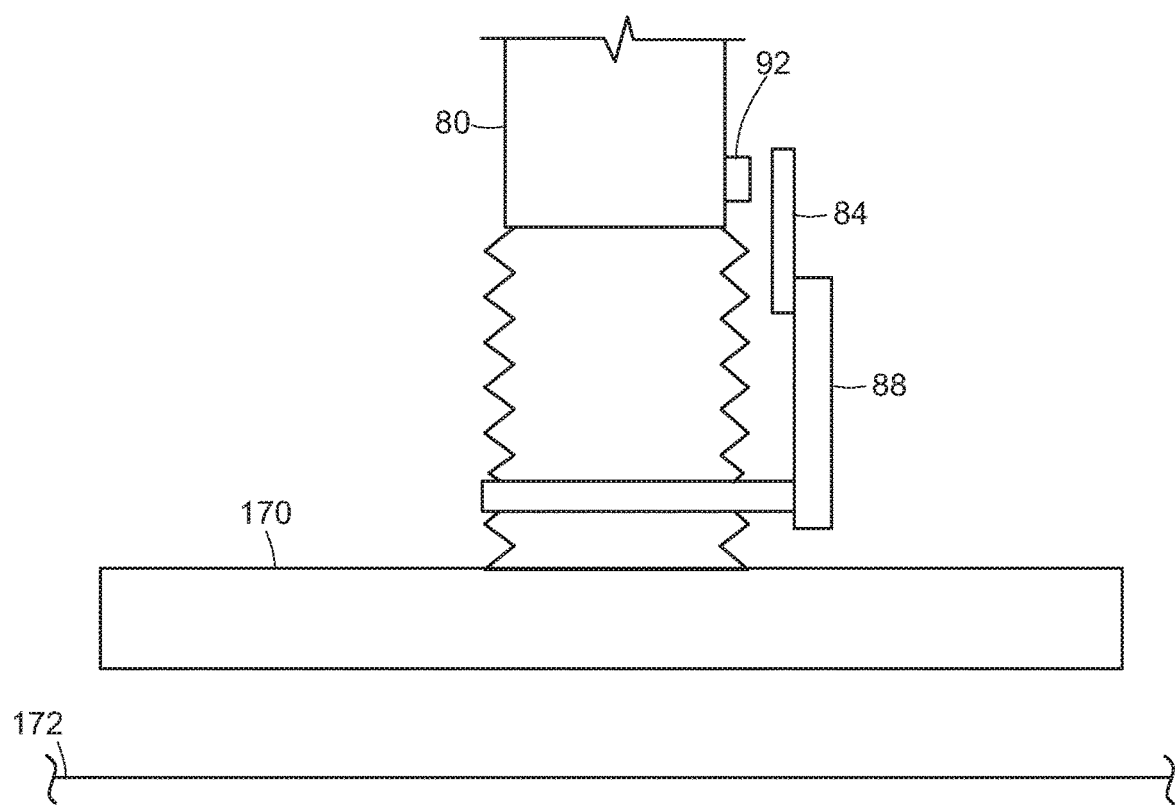

FIGS. 5A and 5B show an object 160 being lifted from a surface 162 by the end effector 82 that includes the load detection device of FIG. 5. Upon engaging the object 160, the system notes the position of the detection device. Once the object 160 is lifted (FIG. 5B), the system notes the change in the sensor output. In this example, the load provided by the object 160 is relatively light. FIGS. 6A and 6B, however, show the end effector lifting a heavy object.

FIGS. 6A and 6B show an object 170 being lifted from a surface 172 by the end effector 82 that includes the load detection device of FIG. 5. Upon engaging the object 170, the system notes the position of the detection device. Once the object 170 is lifted (FIG. 6B), the system notes the change in the position of the detection device. As noted above, in this example, the object 170 is heavy, presenting a higher load.

Figure 7A:
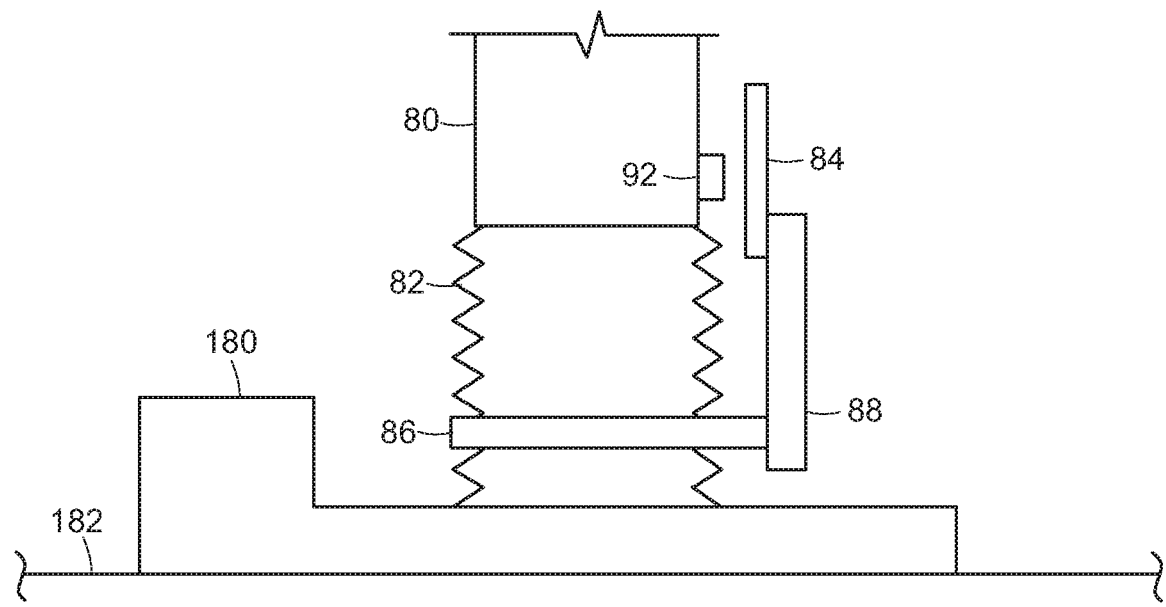
FIGS. 7A and 7B show illustrative diagrammatic views of an end effector in a system of an embodiment of the present invention engaging an object that presents an unbalanced load.
Figure 7B:
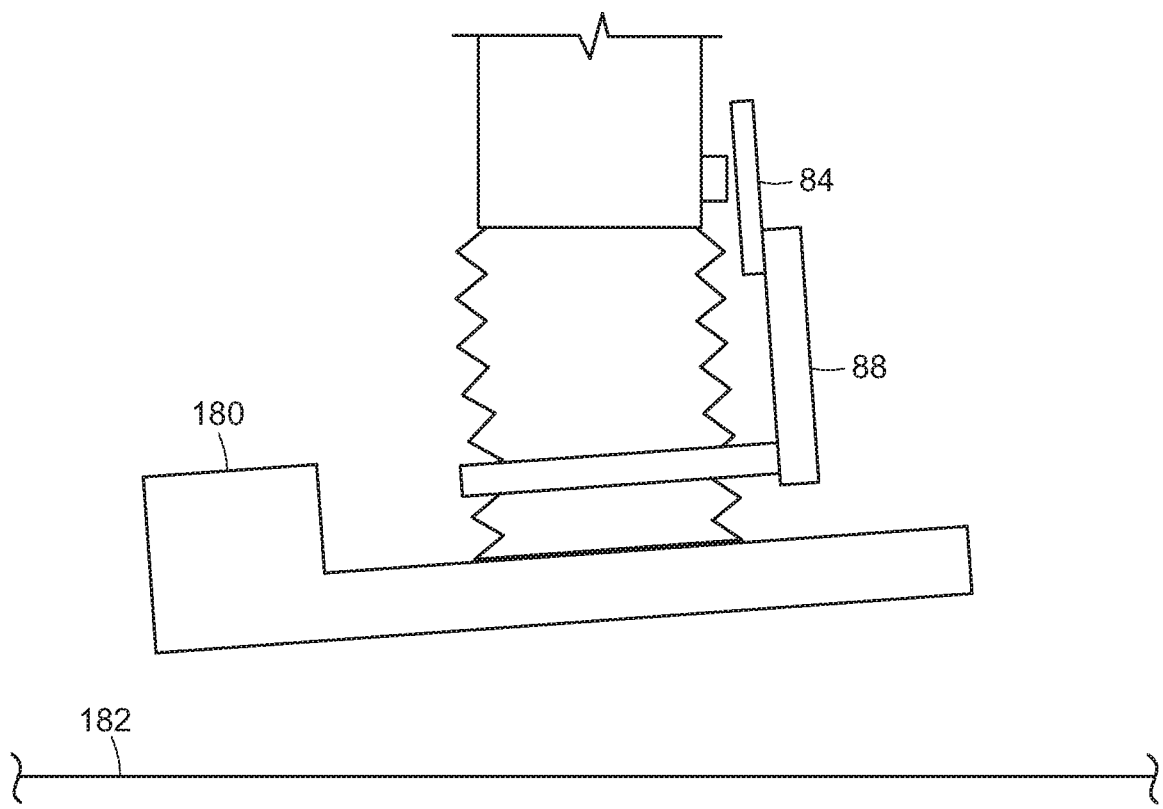

The system may also detect whether a load is not sufficiently balanced. FIGS. 7A and 7B show an object 180 being lifted from a surface 182 by the end effector 82 that includes the load detection device of FIG. 4. Upon engaging the object 180, the system notes the position of the detection device. Once the object 180 is lifted (FIG. 7B), the system notes the change in the position of the detection device. In this example, the object 180 presents a non-balanced load. The compliant element may therefore, undergo substantial translational and angular deformation.

Figure 8:
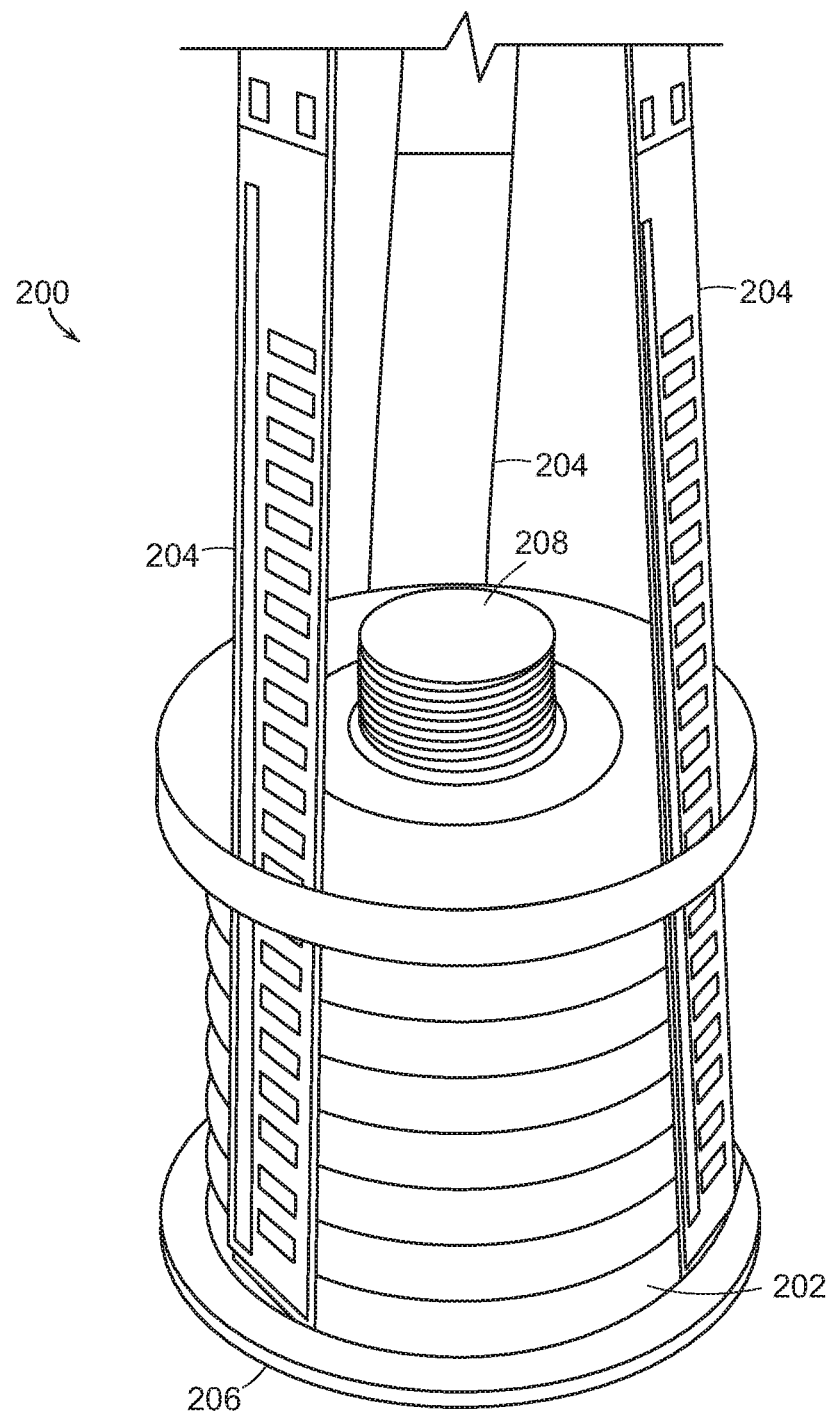
FIG. 8 shows an illustrative diagrammatic isometric view of a sensing manipulator in accordance with a further embodiment of the invention in an extended state (not engaging an object)
Figure 9:
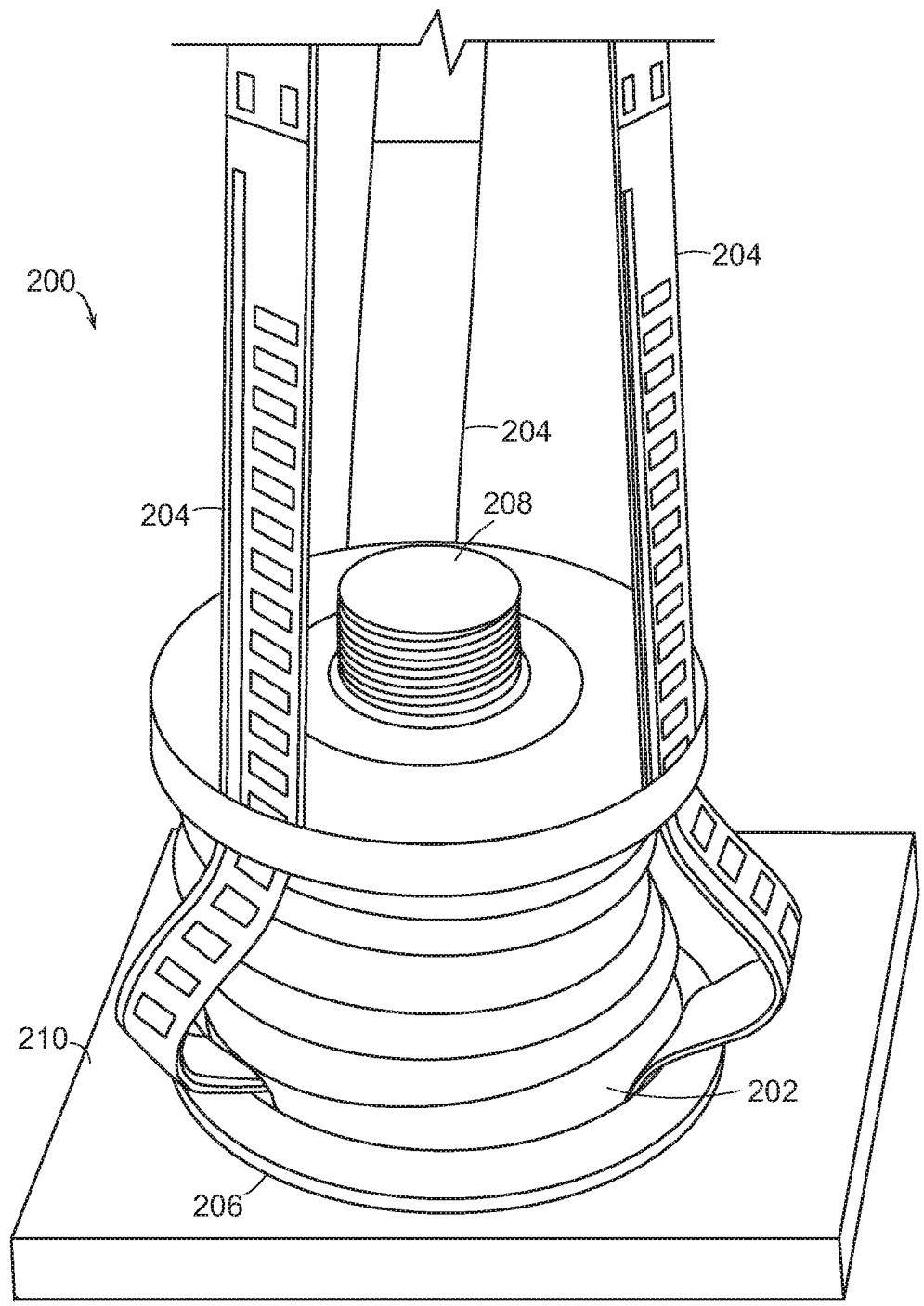
FIG. 9 shows an illustrative diagrammatic isometric view of the sensing manipulator of FIG. 8 in an engaged state (engaging an object)

Various further platform applications include the following. The deformation sensor concept is designed to integrate with existing passive and active compliant components of a robot end-effector. In the above embodiments, suction cups are used as examples of compliant members. Many different compliant elements however, could be used based on the end-effector selected. In accordance with a further embodiment, the invention provides a movement detection system that includes force-sensitive resistors. FIGS. 8 and 9, for example, show a sensing manipulator 200 together with a vacuum cup 202 wherein the movement detection system includes an array (e.g., three) of detectors 204 for sensing the axial flexure of the vacuum cup from which translations/roll/pitch/of the cup can be deduced. In particular, the force-sensitive resistors may include a conductive polymer that is printed on a surface, wherein the conductive polymer changes it resistance in a predictable manner when a force is applied to the surface. The sensing manipulator 200 may be attached to a robotic arm via a mounting element 208 (which couples to a robotic arm mount that passes between two of the detectors 204). A vacuum may be provided at an open end 206 of the vacuum cup 202 for engaging an object 210 (as shown in FIG. 9).

Figure 10:
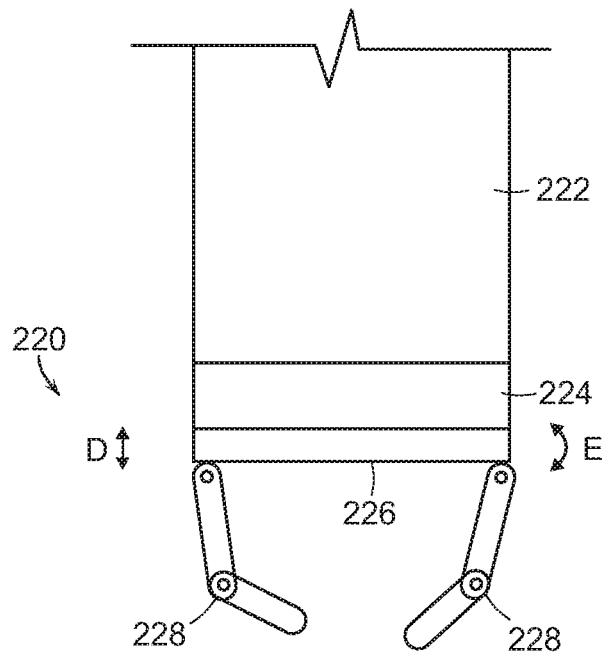
FIG. 10 shows an illustrative diagrammatic view of a sensing manipulator in accordance with a further embodiment of the invention that includes grippers.

Another such alternative compliant element example is the use of a two-fingered robot gripper either at the wrist (as shown in FIG. 10) or on the finger tips (as shown in FIGS. 11A and 11B). Normally compliance is built in at the fingertips or directly behind the wrist of the gripper. A deflection sensor could easily be adapted to accommodate similar alternative designs. In particular, FIG. 10 shows a sensing manipulator 220 in accordance with a further embodiment of the present invention that is attached to a robotic arm 222. The sensing manipulator 220 includes a compliant section 224 and a sensing section 226 that includes a two finger gripper end effector 228. As shown at D and E, the sensing section 226 may provide sensing of the position and orientation of the end effector 228 with respect to the robotic arm 222, e.g., by magnetic or capacitive sensing.

Figure 12:
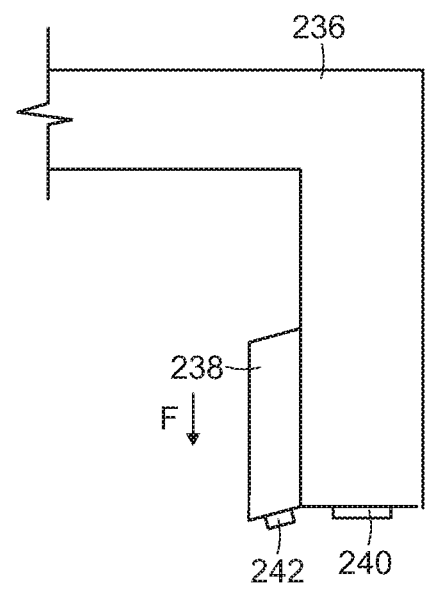
FIG. 12 shows an illustrative diagrammatic enlarged view of a portion of the sensing manipulator of FIG. 11.
Figure 11:
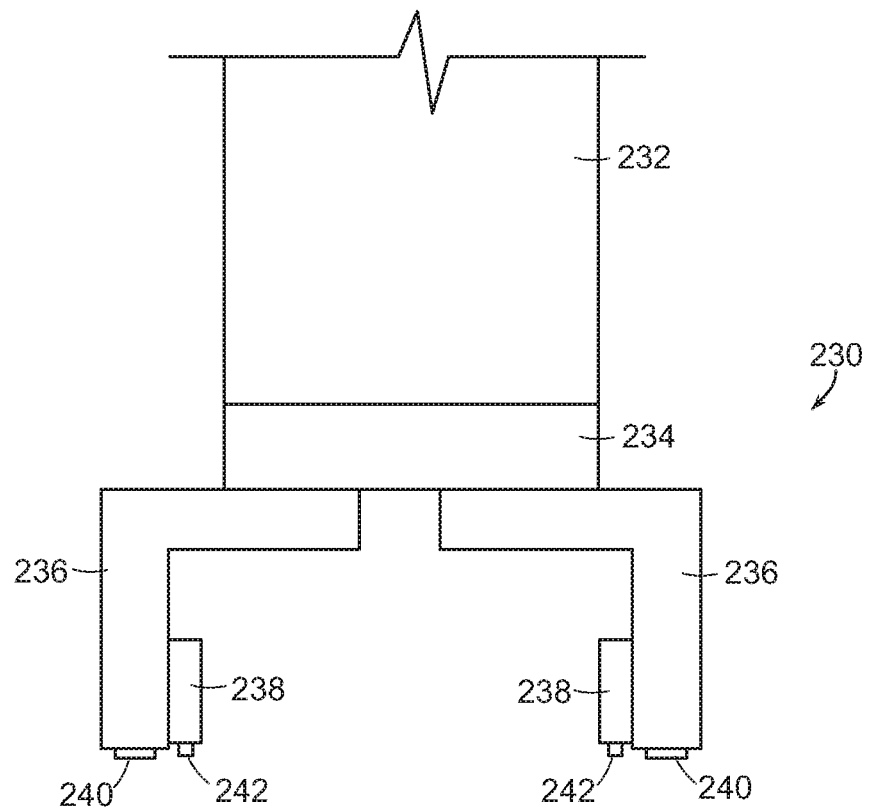
FIG. 11 shows an illustrative diagrammatic view of a sensing manipulator in according accordance with a further embodiment of the invention that includes sensing jaws.

FIG. 11 shows a sensing manipulator 230 that is attached to a robotic arm 232. The sensing manipulator 230 includes a gripper 234 that includes two jaws 236. On one or both jaws is provided a compliant element 238, and on the compliant element 238 is provided a magnet 242. With further reference to FIG. 12 (which shows an enlarged view of a portion of one jaw 236) a corresponding magnetic sensor 240 is provided on the jaw. When the compliant element 238 is under a load (as shown by a force as shown at F), the sensor 242 will move respect to the sensor 240, providing position and orientation sensing data.

The stiffness and sensitivity of the compliant material are also important considerations. Note from FIG. 1 that the location of sensing is along the preexisting compliant structure of the robot system. This allows a system using the deformation sensor to maintain it's original stiffness and compliance properties, unlike prior art solutions. Also important to note is the target location for the deformation sensor in the system. The more distal the sensor is the closer it is to the interaction point, where non-linear complicating effects from the robot are less significant.

The software may involve high-level automation software that uses the data output from the deformation to make a series of important decisions as follows.

Contact State

The most straightforward application of the sensor is thresholding the deformation values from the sensor to detect when contact with the world has occurred. If any axis of deformation moves outside nominal levels, then robot motion can be stopped and appropriate gripping strategy motions may be executed (such as pushing more or less on the environment as needed).

Pre-Grasp Adjustment

When approaching an object for grasping, a robot arm will often first make contact with the object by pushing into it (either intentionally or unintentionally). Compliance is often used in robotic systems by allowing the end-effector to passively re-adjust to the environment by bending against the contact point. By using the deformation sensor to sense this angle of deflection, and then actively controlling the robot to re-adjust and compensate for the deflection by re-positioning itself, grasps can be made more reliable and centered on the object.

Force Sensing

Given a model of how the compliant element deflects under load, the deformation changes may be mapped to forces and torques on the end-effector. This may allow for a number of force-sensing strategies, such as force-guided insertions and grasps, and force-guided placement of objects on surfaces.

Post-Grasp Centerpoint Sensing and Adjustment

Similar to the above two points, after an object is grasped and lifted, gravitational effects will cause the robot end-effector to deflect under the load. Depending on the location of the grasp point with respect to the center-of-mass of the object, this may cause various deformations in the compliant element of the end-effector. Also, a poorly chosen grasp location on a heavy object can induce oscillations between the compliant components and object. The deformation sensor would be capable of sensing both these effects, and may be used to guide the robot to accept or reject grasps and give important information about the direction of the misalignment.

Human and Robot Safety

Due to centripetal effects the end-effector is often the most dangerous point on a moving robot arm. During motions where no environmental interaction is expected the deformation sensor can be monitored for changes and the robot stopped when unexpected events occur. The deformation has advantages over the more traditional joint-level or wrist-level safety guards on a robot, since it is designed into the low-inertia low-mass endpoint of the robot, and has the potential to respond before any damage has been done to the robot, environment, or human obstacles.

The deformation sensing strategy presented here provides a framework that allows sensitive high-resolution sensing of contact between a robot and it's environment, while minimally altering the physical attributes of the robot's compliance. Given a model or properly tuned heuristics the sensor may be used to resolve important information for robot decision making to improve manipulation task performance.

Those skilled in the art will appreciate that numerous modifications and variations may be made to the above disclosed embodiments without departing from the spirit and scope of the present invention.

What is claimed is:

1. A sensing manipulator of an articulated arm, said sensing manipulator providing a vacuum source at a compliant section of an end effector, wherein the compliant section includes a flexible section formed in the shape of a tubular or conical bellows, said sensing manipulator comprising the compliant section for engaging an object and a movement detection system for detecting movement in at least two degrees of freedom of the compliant section as the compliant section engages an object and the sensing manipulator moves the object, wherein the movement detection system includes at least one force sensitive resistor.

2. The sensing manipulator as claimed in claim 1, wherein movement of said compliant section is detectable by the movement detection system in three degrees of freedom.

3. The sensing manipulator as claimed in claim 1, wherein the compliant section is provided as a vacuum cup at an end effector portion of the articulated arm.

4. The sensing manipulator as claimed in claim 1, wherein said end effector portion is provided with a vacuum at an opening of the tubular or conical bellows that is in communication with the vacuum source.

5. The sensing manipulator as claimed in claim 4, wherein the opening is provided at a rim that contacts the object and wherein the movement detection system detects movement of the compliant section at the opening in the at least two degrees of freedom.

6. The sensing manipulator as claimed in claim 1, wherein the movement detection system includes at least three force sensitive resistors.

7. The sensing manipulator as claimed in claim 6, wherein the force sensitive resistors are provided radially outside of the tubular or conical bellows.

8. The sensing manipulator as claimed in claim 6, wherein the sensing manipulator includes a mounting element for coupling to the articulated arm.

9. The sensing manipulator as claimed in claim 8, wherein the mounting element is generally radially centrally located with respect to the tubular or conical bellows.

10. The sensing manipulator as claimed in claim 1, wherein the movement of the compliant section is detected in each of three degrees of freedom.

11. The sensing manipulator as claimed in claim 1, wherein the at least two degrees of freedom include at least two of load, pitch, roll and yaw.

12. A sensing manipulator of an articulated arm, said sensing manipulator providing a vacuum source at a compliant section, said sensing manipulator comprising the compliant section for engaging an object, the compliant section providing movement in at least two degrees of freedom, and a movement detection system including at least one force sensitive resistor for detecting movement of the compliant section in the at least two degrees of freedom of the compliant section as the compliant section engages an object, and for providing output data regarding movement of the compliant section in the at least two degrees of freedom.

13. The sensing manipulator as claimed in claim 12, wherein the compliant section is provided as a vacuum cup at an end effector portion of the articulated arm.

14. The sensing manipulator as claimed in claim 12, wherein said end effector portion is provided with a vacuum at an opening of a tubular or conical bellows that is in communication with a vacuum source.

15. The sensing manipulator as claimed in claim 14, wherein the opening is provided at a rim that contacts the object and wherein the movement detection system detects movement of the compliant section at the opening in the at least two degrees of freedom.

16. The sensing manipulator as claimed in claim 12, wherein the compliant section includes a flexible section formed in the shape of a tubular or conical bellows.

17. The sensing manipulator as claimed in claim 12, wherein the movement detection systems provides output data regarding movement of the compliant section in the at least two degrees of freedom.

18. The sensing manipulator as claimed in claim 12, wherein the movement detection system includes at least three force sensitive resistors.

19. The sensing manipulator as claimed in claim 12, wherein the sensing manipulator includes a mounting element for coupling to the articulated arm.

20. The sensing manipulator as claimed in claim 19, wherein the mounting element is generally radially centrally located with respect to the tubular or conical bellows.

21. The sensing manipulator as claimed in claim 12, wherein the at least two degrees of freedom include at least two of load, pitch, roll and yaw.

22. A method of determining the position and orientation of an object held by an end effector of a programmable motion system, said method comprising the steps of:
engaging the object in a working environment of the programmable motion system using a compliant section of the end effector such that the compliant section directly engages the object;
perceiving an initial position of a movement detector;
lifting the object against gravity;
perceiving a subsequent position of the movement detector, wherein a difference between the initial position and the subsequent position includes at least two degrees of freedom; and
determining at least one of load, pitch, roll and yaw of the object responsive to the difference between the initial position of the movement detector and the subsequent position of the movement detector.

23. The method as claimed in claim 22, wherein the complaint section is provided as a tubular or conical vacuum bellows.

24. A sensing manipulator of an articulated arm, said sensing manipulator providing a vacuum source at a compliant section of an end effector, said sensing manipulator comprising the compliant section for engaging an object and a movement detection system for detecting movement in at least two degrees of freedom of the compliant section as the compliant section engages an object and the sensing manipulator moves the object, wherein the movement detection system includes at least three force sensitive resistors.

25. The sensing manipulator as claimed in claim 24, wherein movement of said compliant section is detectable by the movement detection system in three degrees of freedom.

26. The sensing manipulator as claimed in claim 24, wherein the compliant section is provided as a vacuum cup at an end effector portion of the articulated arm.

27. The sensing manipulator as claimed in claim 24, wherein said end effector portion is provided with a vacuum at an opening of a tubular or conical bellows that is in communication with the vacuum source.

28. The sensing manipulator as claimed in claim 27, wherein the opening is provided at a rim that contacts the object and wherein the movement detection system detects movement of the compliant section at the opening in the at least two degrees of freedom.

29. The sensing manipulator as claimed in claim 24, wherein the compliant section includes a flexible section formed in the shape of a tubular or conical bellows.

30. The sensing manipulator as claimed in claim 24, wherein the sensing manipulator includes a mounting element for coupling to the articulated arm.

31. The sensing manipulator as claimed in claim 30, wherein the mounting element is generally radially centrally located with respect to the tubular or conical bellows.

32. The sensing manipulator as claimed in claim 24, wherein the movement of the compliant section is detected in each of three degrees of freedom.

33. The sensing manipulator as claimed in claim 24, wherein the at least two degrees of freedom include at least two of load, pitch, roll and yaw.

34. A sensing manipulator of an articulated arm, said sensing manipulator providing a vacuum source at a compliant section of an end effector, said sensing manipulator comprising the compliant section for engaging an object and a movement detection system for detecting movement in at least two degrees of freedom of the compliant section as the compliant section engages an object and the sensing manipulator moves the object, wherein the at least two degrees of freedom include at least two of load, pitch, roll and yaw.

35. The sensing manipulator as claimed in claim 34, wherein movement of said compliant section is detectable by the movement detection system in three degrees of freedom.

36. The sensing manipulator as claimed in claim 34, wherein the compliant section is provided as a vacuum cup at an end effector portion of the articulated arm.

37. The sensing manipulator as claimed in claim 34, wherein said end effector portion is provided with a vacuum at an opening of a tubular or conical bellows that is in communication with the vacuum source.

38. The sensing manipulator as claimed in claim 37, wherein the opening is provided at a rim that contacts the object and wherein the movement detection system detects movement of the compliant section at the opening in the at least two degrees of freedom.

39. The sensing manipulator as claimed in claim 34, wherein the compliant section includes a flexible section formed in the shape of a tubular or conical bellows.

40. The sensing manipulator as claimed in claim 39, wherein the movement detection system includes at least one force sensitive resistor.

41. The sensing manipulator as claimed in claim 34, wherein the movement detection system includes at least three movement detectors.

42. The sensing manipulator as claimed in claim 41, wherein the movement detectors each include a force sensitive resistor.

43. The sensing manipulator as claimed in claim 41, wherein the movement detectors each include a magnetic field sensor.

44. The sensing manipulator as claimed in claim 34, wherein the movement detection system includes an attachment band around the compliant section.

45. The sensing manipulator as claimed in claim 34, wherein the movement of the compliant section is detected in each of three degrees of freedom.

46. A sensing manipulator of an articulated arm, said sensing manipulator providing a vacuum source at a compliant section, said sensing manipulator comprising the compliant section for engaging an object, the compliant section providing movement in at least two degrees of freedom, and a movement detection system for detecting movement of the compliant section in the at least two degrees of freedom of the compliant section as the compliant section engages an object, and for providing output data regarding movement of the compliant section in the at least two degrees of freedom, wherein the at least two degrees of freedom include at least two of load, pitch, roll and yaw.

47. The sensing manipulator as claimed in claim 46, wherein the compliant section is provided as a vacuum cup at an end effector portion of the articulated arm.

48. The sensing manipulator as claimed in claim 46, wherein said end effector portion is provided with a vacuum at an opening of a tubular or conical bellows that is in communication with the vacuum source.

49. The sensing manipulator as claimed in claim 48, wherein the opening is provided at a rim that contacts the object and wherein the movement detection system detects movement of the compliant section at the opening in the at least two degrees of freedom.

50. The sensing manipulator as claimed in claim 46, wherein the compliant section includes a flexible section formed in the shape of a tubular or conical bellows.

51. The sensing manipulator as claimed in claim 46, wherein the movement detection systems provides output data regarding movement of the compliant section in the at least two degrees of freedom.

52. The sensing manipulator as claimed in claim 46, wherein the movement detection system includes at least three movement detectors.

53. The sensing manipulator as claimed in claim 46, wherein the movement detection system includes a force sensitive resistor.

54. The sensing manipulator as claimed in claim 46, wherein the movement detection system includes a magnetic field sensor.

55. The sensing manipulator as claimed in claim 46, wherein the movement detection system includes an attachment band around the compliant section.

* * * * *

UNITED STATES PATENT AND TRADEMARK OFFICE
CERTIFICATE OF CORRECTION

PATENT NO. : 10,618,177 B2
APPLICATION NO. : 16/212113
DATED : April 14, 2020
INVENTOR(S) : Thomas Wagner et al.

Page 1 of 1

It is certified that error appears in the above-identified patent and that said Letters Patent is hereby corrected as shown below:

In the Specification

In Column 5, Lines 43-44 should read:
"shown in FIG. 10) or on the finger tips (as shown in FIG. 11). Normally compliance is built in at the"

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*